(12) United States Patent
Lee

(10) Patent No.: US 6,325,527 B1
(45) Date of Patent: Dec. 4, 2001

(54) VANITY MIRROR OF SUN VISOR FOR AUTOMOTIVE VEHICLE

(75) Inventor: Seung-kun Lee, Anyang-shi (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 09/592,930

(22) Filed: Jun. 13, 2000

(30) Foreign Application Priority Data

Jun. 30, 1999 (KR) .................................................. 99-12236

(51) Int. Cl.[7] .............................. B60Q 3/02; F21V 21/00
(52) U.S. Cl. .......................... 362/492; 362/137; 362/375; 362/368
(58) Field of Search .......................... 362/492, 135–137, 362/142–144, 155, 365, 368, 375, 394

(56) References Cited

U.S. PATENT DOCUMENTS

| | | | |
|---|---|---|---|
| 4,760,503 | * | 7/1988 | VandenBerge et al. .............. 362/137 |
| 4,866,579 | * | 9/1989 | Miller et al. .......................... 362/144 |
| 5,117,337 | * | 5/1992 | Sakuma ................................. 362/492 |
| 5,331,518 | * | 7/1994 | Roark et al. .......................... 362/492 |
| 5,430,624 | * | 7/1995 | Yoshida et al. ....................... 362/492 |

* cited by examiner

Primary Examiner—Alan Cariaso
(74) Attorney, Agent, or Firm—Birch, Stewart, Kolasch & Birch, LLP

(57) ABSTRACT

Disclosed is a vanity mirror of a sun visor for an automotive vehicle. The vanity mirror includes a mirror body fitted in a recess provided at the sun visor and mounted with a mirror, the mirror body having a pair of recessed spring fitting portions and an engagement protrusion, a lamp body integral with the mirror body, the lamp body being mounted with a main lamp holding bracket, an additional lamp holding bracket coupled to the main lamp holding bracket, and an electric bulb held by the lamp holding brackets, a cover hingably coupled to the mirror body, the cover having, at respective upper corners thereof, a pair of hinge portions hingably fitted in the spring fitting portions of the mirror body, a pair of plate springs respectively fitted in the spring fitting portions of the mirror body and adapted to urge the hinge portions of the cover so that the cover is maintained in an opened or closed state, a mirror-end base plate mounted in the recess of the sun visor and provided with a groove for receiving the engagement protrusion of the mirror body, and a lamp-end base plate mounted in the recess of the sun visor and provided with cylindrical columns fitted in the circular holes of the lamp body, the cylindrical columns supporting the main lamp holding bracket by set screws threadedly coupled thereto via the main lamp holding bracket.

3 Claims, 9 Drawing Sheets

-PRIOR ART-

VANITY MIRROR OF SUN VISOR FOR AUTOMOTIVE VEHICLE

BACKGROUND OF THE INVENTION

1. Field of the Invention

The present invention relates to a vanity mirror attached to a sun visor for automotive vehicles, and more particularly to a vanity mirror having a simple construction and an improved reliance in operation.

2. Description of the Prior Art

Generally, an automotive vehicle is provided with sun visors mounted in the interior of the vehicle in front of the driver's and passenger's seats, respectively. Each of the sun visors is hingably coupled to a hinge bar hingably mounted to a body of the vehicle in order to shield the eyes of the driver or passenger from the rays of the sun incident to the interior of the vehicle, thereby preventing him from being blinded by the sun light. In addition to such a main function for shielding the driver or passenger from the rays of the sun, many of sun visors have additional functions, for example, a function for allowing the passenger to conveniently view his face image reflected by a mirror attached to the rear surface of the sun visor in the interior of the vehicle. Such a mirror, which is attached to the rear surface of the sun visor, is called a "vanity mirror".

However, it is impossible to normally use such a vanity mirror in cloudy weather or at night because the image reflected by the vanity mirror is dark. In order to solve this problem, the vanity mirror is generally provided with a lamp at one side thereof. Typically, a cover is also provided to cover the vanity mirror along with the lamp. The cover is hingably mounted to the sun visor. Such a cover serves to protect the passenger from broken pieces of the vanity mirror and lamp which may shatter when an accident occurs. Generally, the cover also functions as a switching actuator for switching on and off the lamp.

These vanity mirror, lamp, and cover are assembled together into a single assembly which is mounted to the rear surface of the sun visor.

An example of a conventional vanity mirror is illustrated in FIG. 13. As shown in FIG. 13, the vanity mirror includes a mirror body 201 having two openings 202 and 203 with different sizes. A mirror 204 is fitted in the larger opening, namely, the opening 202. A double-sided adhesive tape 205 is attached to the rear surface of the mirror 204. In the smaller opening 203, a lamp is mounted to the mirror body 201. The lamp includes a lamp body 210 fitted in the smaller opening 203, an electric bulb 207 mounted to the lamp body 210 by means of a mounting bracket 206, a lens 208 mounted to a front end of the lamp body 210 in front of the electric bulb 207, and a switch 209 mounted to an upper end of the lamp body 210. A rear cover 211 is mounted to the rear end of the mirror body 201. A front cover 212 is also mounted to the front end of the mirror body 201 at opposite sides of its upper end by means of a pair of pins 213 in such a fashion that it can hinge about the pins 213 between an opened position and a closed position. The front cover 212 is resiliently supported by a pair of plate springs 214 disposed at opposite lateral ends of the mirror body 201 so that it can be maintained in a completely opened or closed state. The front cover 212 is configured to depress the switch 209 at its opened position, thereby turning on the electric bulb 207. The vanity mirror having the above mentioned assembly is mounted to the rear surface of a sun visor.

When the user turns the sun visor downwardly to expose the rear surface of the sun visor, the vanity mirror is accessible. In this state, opening the cover 212 causes the electric bulb 207 to be turned on. Even in the dark interior of the vehicle, the user can clearly view his face image reflected by the mirror 204 by virtue of the light emitted from the electric bulb 207.

Meanwhile, it is desirable for the vanity mirror to have a thin, simple, and light construction, taking into consideration the fact that the vanity mirror is mounted to a planar sun visor. It is also important for the vanity mirror to be stably maintained at its opened state in order to prevent the ON state of the switch achieved in accordance with the opened state of the vanity mirror from being unintentionally released, that is, to maintain the ON state of the electric bulb.

However, the above mentioned conventional vanity mirror has a thick and heavy construction due to a complexity in construction caused by an increased number of constituting elements. For example, the lamp body 210 including the electric bulb 207 is separate from the mirror body 210. The rear cover 211 is also mounted to the rear surface of the mirror body 201. In addition to such a thick and heavy construction, the conventional vanity mirror has various drawbacks. That is, the mounted state of the plate springs 214, which are fitted in holes formed at the rear surface of the mirror body 201 near opposite lateral ends of the mirror body 201, is unstable. For this reason, the plate springs 214 may be easily separated from their mounted positions, thereby causing the cover 212 to be unstable in its opened state. This results in a problem in that the electric bulb 207 may be unintentionally turned off during its use. The bracket 206 serves not only to hold the electric bulb 207, but also as an electric line for supplying current to the electric bulb 207. For this reason, the bracket 206 has a complicated construction. Such a complicated construction of the bracket 206 results in a complexity in the inner construction of the lamp body 210 for providing a mounting area for the bracket 206. As a result, there is a difficulty in the manufacture of the lamp body 210.

SUMMARY OF THE INVENTION

Therefore, the present invention has been made in view of the above mentioned problems, and an object of the invention is to provide a vanity mirror of a sun visor for an automotive vehicle which has a simple, light and thin construction using constituting elements simplified in construction and decreased in number while being capable of providing a stable mounting of plate springs adapted to maintain a cover at its opened or closed position, thereby allowing the cover to be stably maintained in its opened state, so that the electric bulb of a lamp adapted to be turned on and off in accordance with the opened and closed positions of the cover is prevented from being unintentionally turned off during its use.

In accordance with the present invention, this object is accomplished by providing A vanity mirror of a sun visor for an automotive vehicle comprising: a mirror body fitted in a recess provided at the sun visor and mounted with a mirror, the mirror body having a pair of recessed spring fitting portions at respective upper corners thereof and an engagement protrusion at one lateral end thereof; a lamp body integral with the mirror body, the lamp body being mounted with a main lamp holding bracket, an additional lamp holding bracket coupled to the main lamp holding bracket, an electric bulb held by the lamp holding brackets, and a lens while having circular holes; a cover hingably coupled to the mirror body in such a fashion that it is hinged between an opened position thereof and a closed position thereof, the cover having, at respective upper corners thereof, a pair of hinge portions hingably fitted in the spring fitting portions of the mirror body; a pair of plate springs respectively fitted in the spring fitting portions of the mirror body and adapted to urge the hinge portions of the cover so that the cover is maintained in an opened or closed state; a mirror-end base plate mounted in the recess of the sun visor and provided with a groove for receiving the engagement protrusion of the mirror body; and a lamp-end base plate mounted in the recess of the sun visor and provided with cylindrical columns fitted in the circular holes of the lamp body, the cylindrical columns supporting the main lamp holding bracket by set screws threadedly coupled thereto via the main lamp holding bracket; whereby the mirror body and the lamp body are fitted in the recess of the sun visor in an integral fashion.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Figure 1:
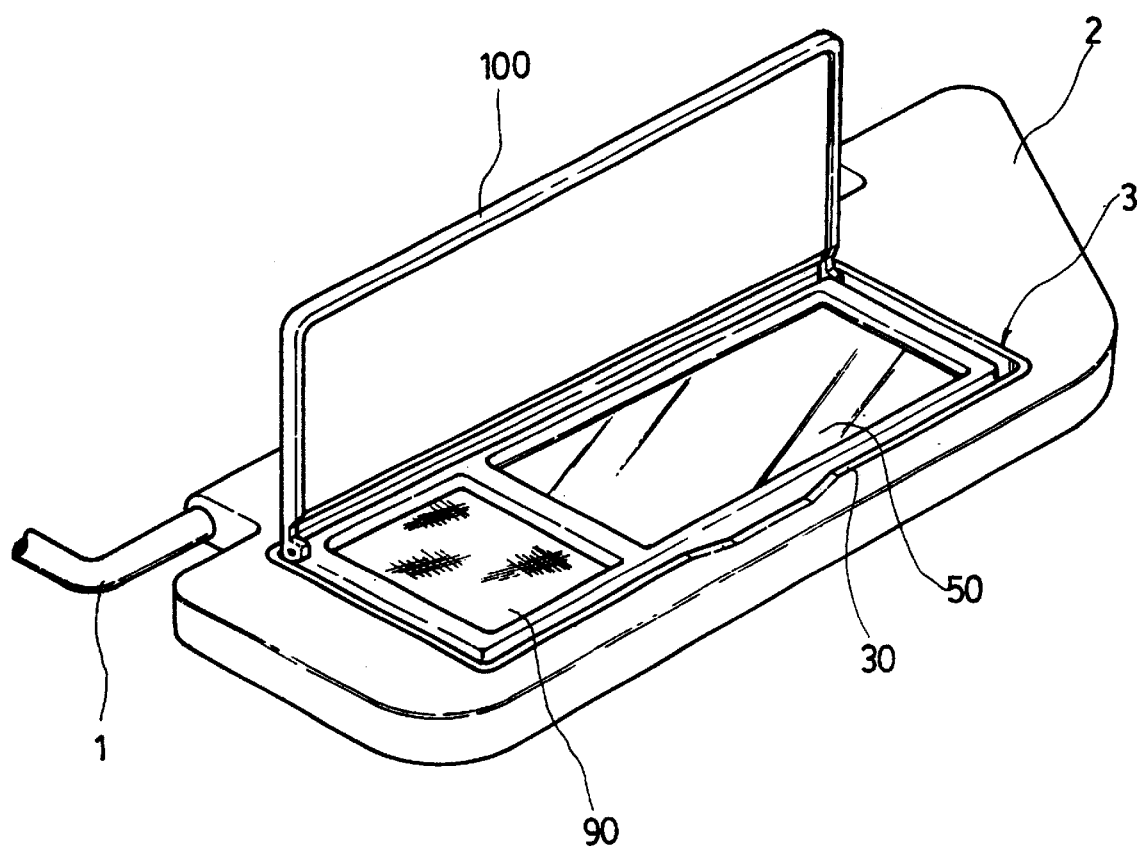
FIG. 1 is a perspective view illustrating a sun visor for an automotive vehicle to which a vanity mirror according to the present invention is mounted.

FIG. 1 is a perspective view illustrating a sun visor for an automotive vehicle to which a vanity mirror according to the present invention is mounted. The sun visor, which is denoted by the reference numeral 2 in FIG. 1, is hingably mounted in the interior of the vehicle in front of either the driver's seat or the passenger's seat. As shown in FIG. 1, the sun visor 2 is hingably coupled to a hinge bar 1 hingably mounted to a body of the vehicle. A vanity mirror 3 is mounted to a rear surface of the sun visor 2. The vanity mirror 3 includes a mirror body 30, a mirror 50 mounted to the mirror body 30, and a lamp mounted to the mirror body 30. In association with the lamp, only a lens 90, which is included in the lamp, is shown in FIG. 1. The vanity mirror 3 also includes a cover 100 hingably mounted to the mirror body 30.

The mirror body 30 of the vanity mirror 3 is mounted to the rear surface of the sun visor 2 in such a fashion that it is fitted in a rectangular recess 4 formed at the rear surface of the sun visor 2. In the recess 4, a pair of base plates 10 and 20 are mounted to the sun visor 2 in such a fashion that longitudinal ends of each base plate are buried in a body of the sun visor 2. The mirror body 30 is mounted to the base plates 10 and 20.

The body of the sun visor 2 is made of a liquid foam molded in a mold to have a desired construction. In the process of molding the sun visor 2, a preform is first manufactured which has a recess having a height corresponding to the height of the recess 4. Thereafter, the base plates 10 and 20 are placed in position on the preform. In this state, a foam is molded on the preform and then cured. Thus, the body of the sun visor 2 is obtained in which each of the base plates 10 and 20 is buried at its longitudinal ends outside the recess 4.

Figure 3:
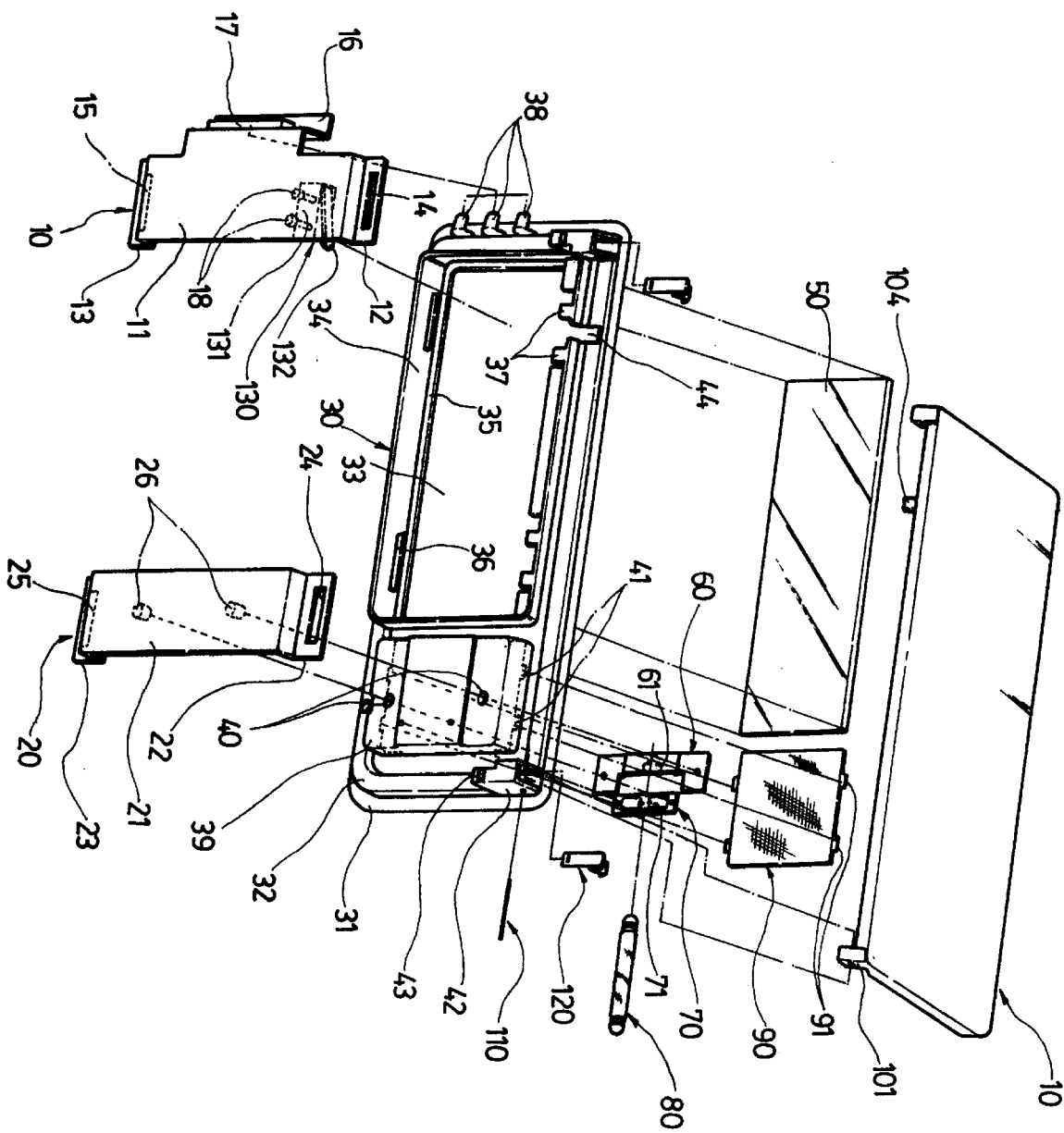
FIG. 3 is an exploded perspective view illustrating a rear construction of the vanity mirror according to the present invention.
Figure 4:
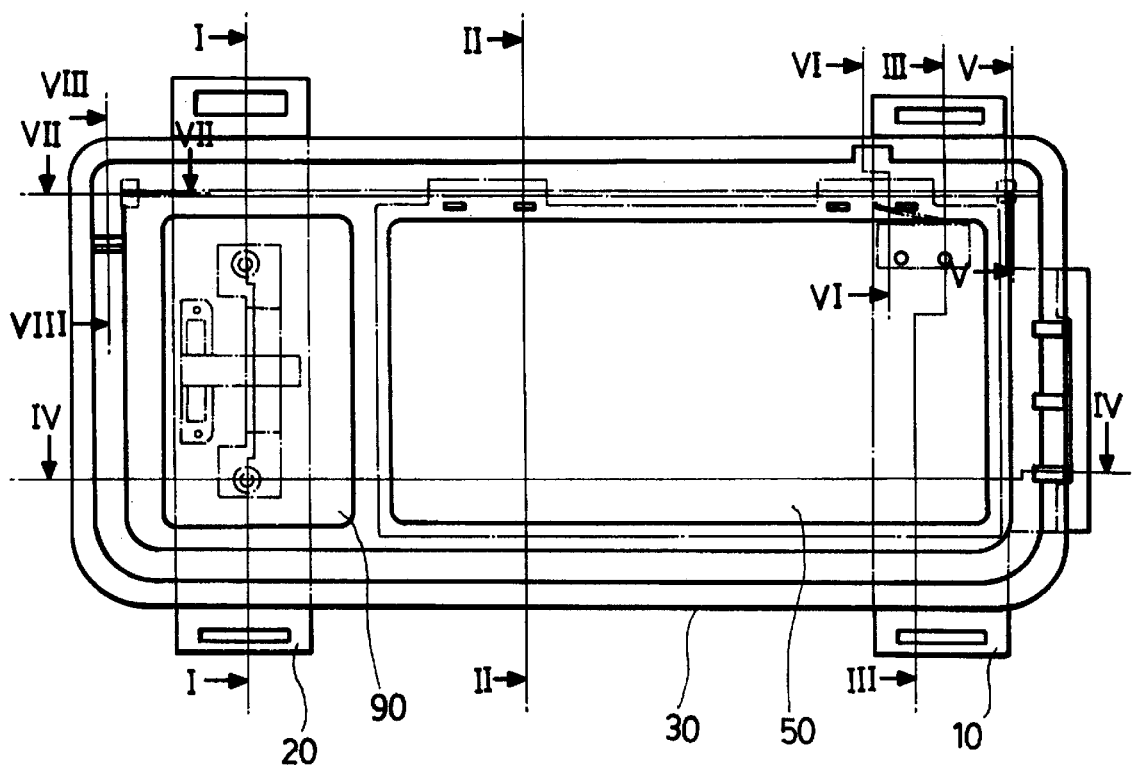
FIG. 4 is a front view of the vanity mirror in an assembled state.

Referring to FIG. 3 illustrating an exploded rear construction of the vanity mirror according to the present invention, the base plate 10, which is for the mirror 50, has a base plate 11 comprised of a rectangular plastic plate and bent by 90° twice, that is, vertically and horizontally, at longitudinal ends thereof to form upper and lower bent pieces 12 and 13 each having vertical and horizontal portions. The upper and lower bent pieces 12 and 13 have rectangular slots 14 and 15 at their horizontal portions, respectively. A lateral extension is provided at one lateral end of the base plate 11, namely, the left end when viewed in FIG. 3. The lateral extension is bent by 90° twice, that is, vertically and horizontally, at a desired lateral position thereof to form a lateral bent piece 16 having vertical and horizontal portions. The lateral bent piece 16 is formed with a rectangular groove 17 in accordance with a pressing process. The base plate 11 is also mounted with two pins 18 having a circular cross section. The pins 18 are arranged on the front surface of the base plate 11 at the upper portion of the base plate 11 so that they extend forwardly.

Similar to the mirror-end base plate 10, the base plate 20, which is for the lamp, has a main plate 21 provided at longitudinal ends thereof with upper and lower bent pieces 22 and 23 each having vertical and horizontal portions. The upper and lower bent pieces 22 and 23 have rectangular slots 24 and 25 at their horizontal portions, respectively. The main plate 21 is also provided with two cylindrical columns 26. The columns 26 are centrally arranged on the front surface of the main plate 21 at the upper portion of the base plate 11 so that they extend forwardly while being vertically spaced apart from each other.

Figure 8:
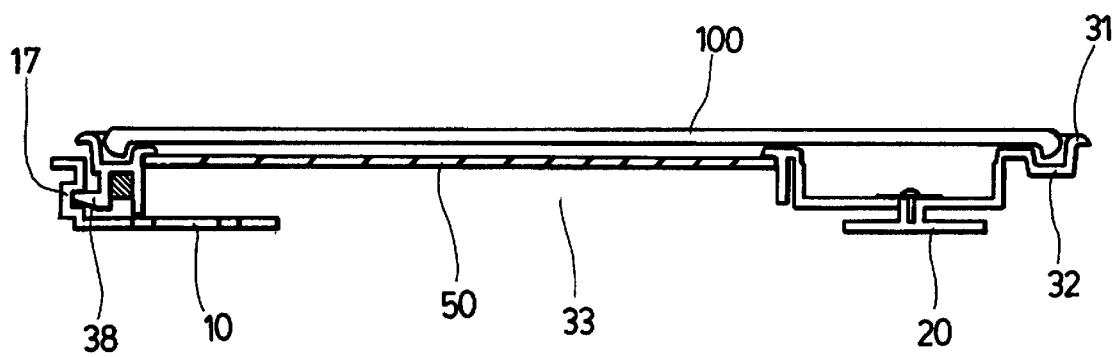
FIG. 8 is a cross-sectional view taken along the line IV—IV of FIG. 4.
Figure 9:
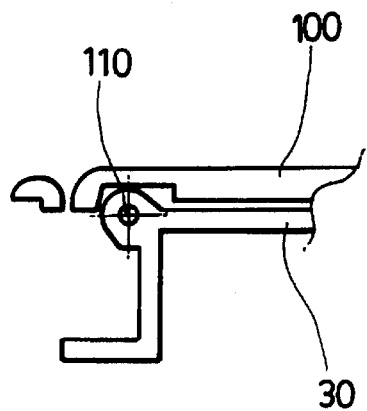
FIG. 9 is a cross-sectional view taken along the line V—V of FIG. 4.
Figure 10:
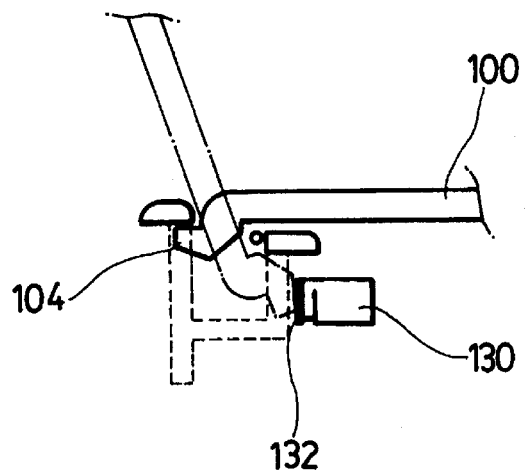
FIG. 10 is a cross-sectional view taken along the line VI—VI of FIG. 4.

The mirror body 30 has an integral construction including a portion for mounting the mirror 50 and a portion for mounting the lamp. That is, the mirror body 30 includes an opening 33 adapted to mount the mirror 50 therein in such a fashion that the mirror 50 is forwardly exposed at its front surface, and a lamp body 39 formed integrally with the opening 33. The lamp body 39 is adapted to mount thereon an electric bulb 80 along with the lens 90 for diffusing the light of the electric bulb 80. As best shown in FIGS. 3 and 8, the mirror body 30 has a flange 31 at its outermost edge. Inside the flange 31, the mirror body 30 is provided with a seating groove 32 extending along the entire edge of the mirror body 30 to receive a rearwardly and inwardly protruded edge of the cover 100. The opening 33, which has a rectangular shape, is formed at one side portion of the mirror body 30 inside the seating groove 32 in order to mount the mirror 50 therein. At one side of the opening 33, the lamp body 39, which has a rectangular box shape, is arranged to mount the electric bulb 80. The lamp body 39 is rearwardly protruded.

At the rear of the opening 33, an edge wall 34 extends rearwardly while extending along the opening 33. The edge wall 34 is provided at the front end thereof with an inward flange 35 adapted to prevent the mirror 50 fitted in the opening 33 from being forwardly separated from the opening 33. At the rear of the inward flange 35, a pair of laterally spaced support protrusions 36 are upwardly protruded from the lower portion of the edge wall 34. Similar to the support protrusions 36, a pair of laterally spaced support protrusions 37 are downwardly protruded from the upper portion of the edge wall 34.

A plurality of vertically spaced engagement protrusions 38 are outwardly protruded in a lateral direction from one lateral end of the mirror body 30, namely, the left end when viewed in FIG. 3. The lamp body 39 is formed at the bottom thereof with a pair of circular holes 40 for receiving the columns 26 of the lamp-end base plate 20. The lamp body 39 is also provided at the upper and lower walls thereof with two pairs of rectangular slots 41 arranged near the front end of the lamp body 39, respectively.

The mirror body 30 also has, at the upper end thereof, a pair of hinge receiving portions 42 arranged on the rear surface of the mirror body 30 at both lateral ends of the mirror body 30 rearwardly of the seating groove 32. The hinge receiving portions 42 of the mirror body 30 receive plate springs 120 in such a fashion that each plate spring 120 is fitted around a rear wall of an associated one of the hinge receiving portions 42. Each hinge receiving portion 42 is opened at its upper and front portions while having opposite side walls along with the rear wall. An engagement groove 43 is provided at the rear wall of each hinge receiving portion 42 near the lower end of the rear wall.

A bracket is also provided to hold the electric bulb 80 in the lamp body 39. The bracket includes a U-shaped main bracket 60, and an additional bracket 70 having a rectangular construction and being smaller than the main bracket 60. The main bracket 60 and additional bracket 70 have, at their central portions, rings 61 and 71 for horizontally fitting the electric bulb 80 therein, respectively.

The lens 90, which is mounted to the lamp body 39 after the mounting of the electric bulb 80 to cover the electric bulb 80, is comprised of a rectangular plastic plate and has a structure with a reflection surface for effectively diffusing the light of the electric bulb 80. The lens 90 is provided at upper and lower ends thereof with two pairs of laterally spaced fitting protrusions 91 adapted to be respectively fitted in the rectangular slots 41 of the lamp body 39.

Figure 12:
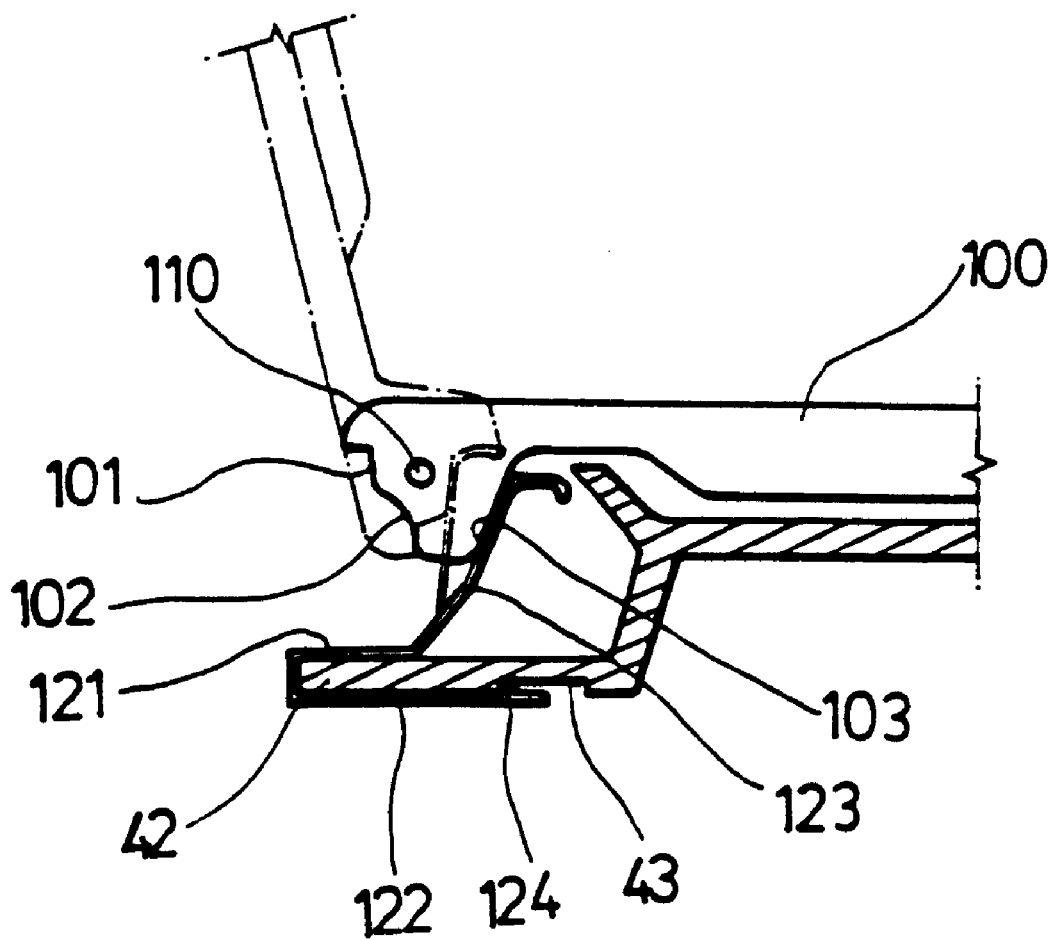
FIG. 12 is a cross-sectional view taken along the line VIII—VIII of FIG. 4.
Figure 13:
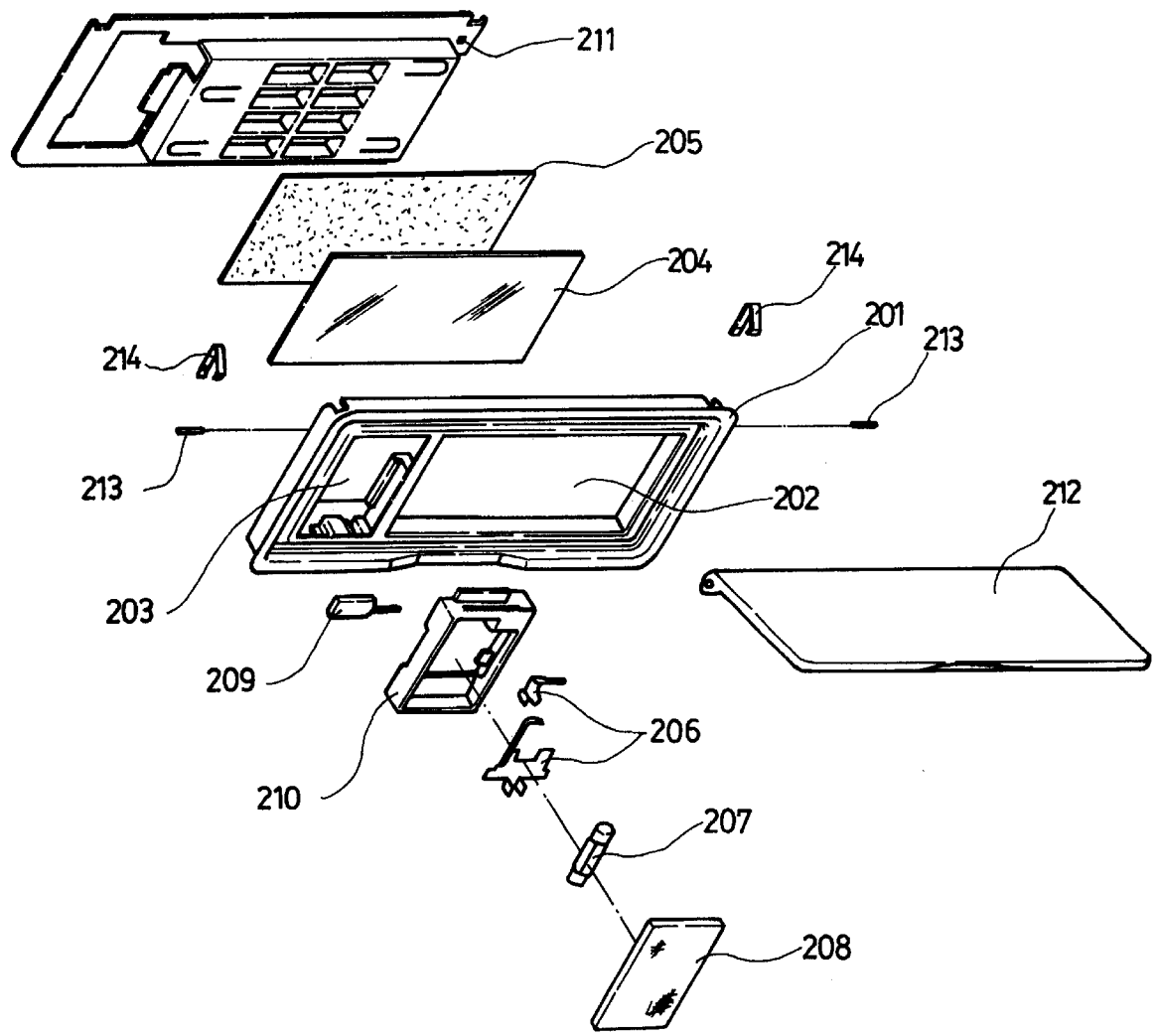
FIG. 13 is an exploded perspective view illustrating a conventional vanity mirror.

As best shown in FIG. 12, each plate spring 120, which is fitted in an associated one of the hinge receiving portions 42, has a U-shaped construction including an upper plate 121 and a lower plate 122 integral with the upper plate 121. The upper plate 121 is upwardly bent by a desired angle while having a round upper end to provide a support piece 123. The lower plate 122 has an upwardly extending protrusion 124 at its free end.

The mirror 50 is a general planar mirror having a rectangular shape. The electric bulb 80 has a cylindrical bulb body provided with electrodes at both ends thereof. The cover 100, which serves to cover the front surface of the mirror body 30, has a pair of hinge portions 101 respectively arranged at upper corners of the cover 100 and hingably coupled to the mirror body 30 by means of pins 110. Each hinge portion 101 has an inverted trapezoidal shape so that it has a round and narrow cam surface 102 at its free end and an inclined surface 103 extending from the cam surface 102, as shown in FIG. 12. A switch actuating member 104 is also provided at the upper end of the cover 100. In a state in which the cover 100 is hingably coupled to the mirror body 30, the switch actuating member 104 is aligned with the tip of a moving terminal 132 provided at a switch 130 so that it comes into contact with the tip of the moving terminal 132. The switch 130 is mounted to the upper portion of the mirror-end base plate 10 and has a switch body 131 having holes engaged with the pins 18 of the mirror-end base plate 10. The portion of the mirror body 30 disposed between the support protrusions 37 arranged in a region corresponding to the mirror-end base plate 10 is partially cut out to form a cutout 44 adapted to provide a space allowing a rotating movement of the switch actuating member 104.

Now, the assembly and operation of the vanity mirror having the above mentioned configuration will be described.

Figure 2:
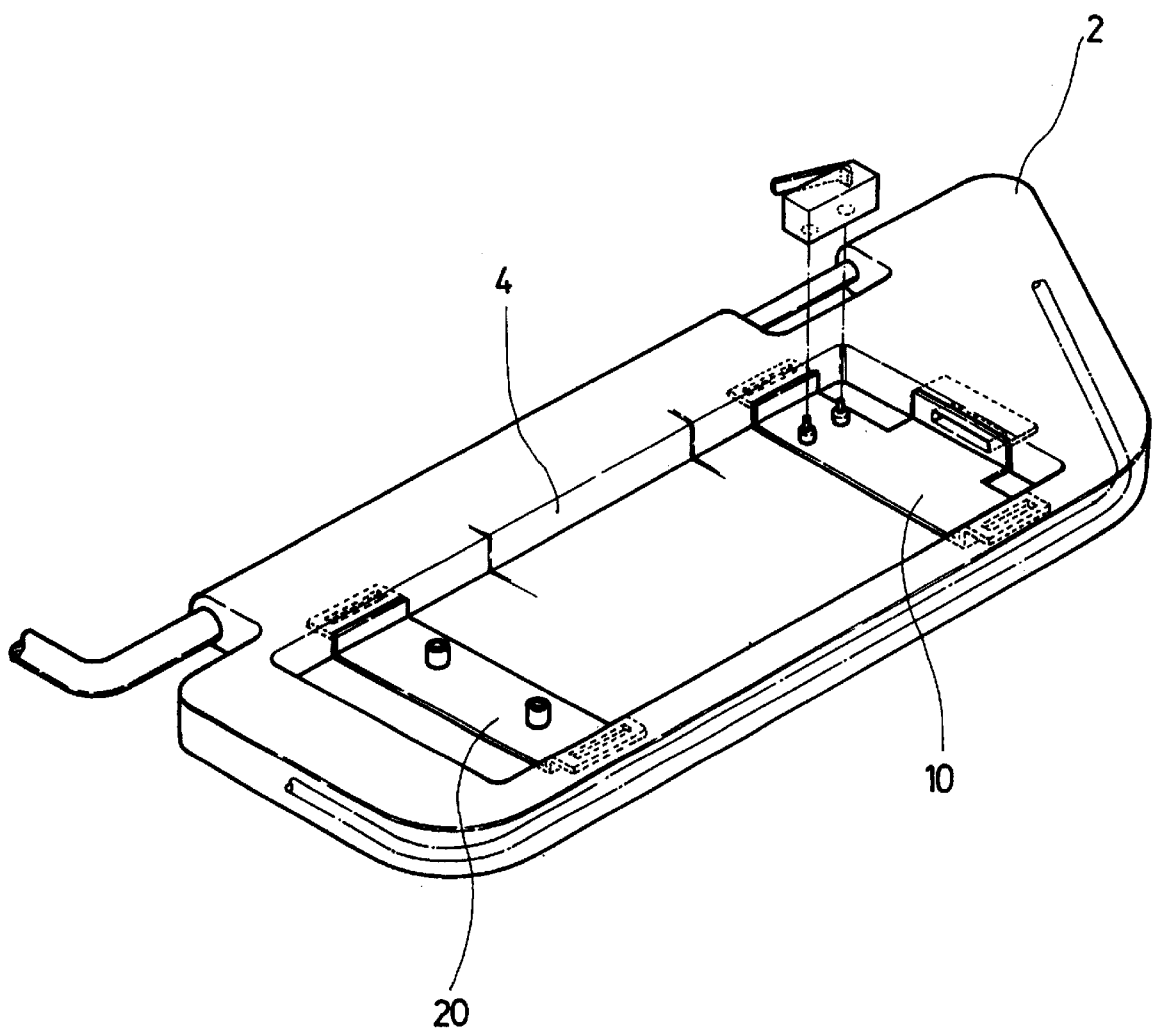
FIG. 2 is a perspective view illustrating the sun visor in a state before the vanity mirror is mounted to the sun visor.

First, the sun visor 2 is first prepared which is manufactured in a state carrying the mirror-end base plate 10 and lamp-end base plate 20 in such a fashion that the bent pieces 12, 13, 16, 22, and 23 are buried in the body of the sun visor 2 outside the recess 4 of the sun visor 2. The switch 130 is then mounted to the mirror-end base plate 10 in a state seated in the recess 4 by engaging the holes of the switch body 131 with the pins 18 of the mirror-end base plate 10, as shown in FIG. 2. Thereafter, the mirror body 30 is mounted to the sun visor 20 by engaging the engagement protrusions 38 of the mirror body 30 with the rectangular groove 17 formed at the lateral bent piece 16 of the mirror-end base plate 10.

Figure 5:
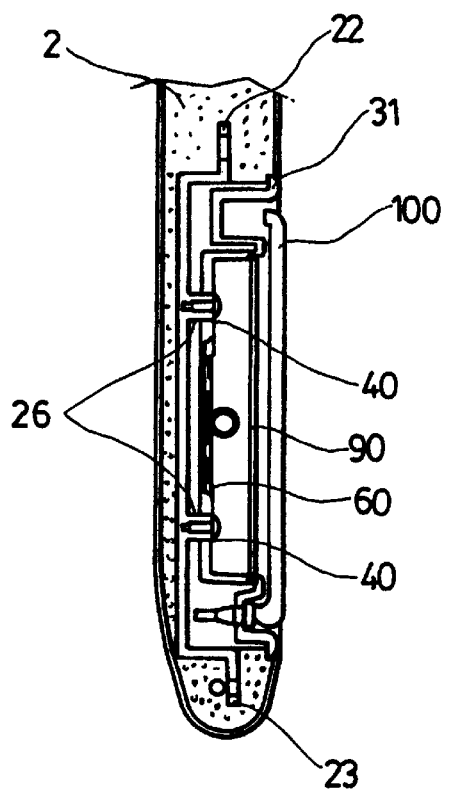
FIG. 5 is a cross-sectional view taken along the line I—I of FIG. 4.

In this state, the cylindrical columns 26 provided at the lamp-end base plate 20 are upwardly exposed through the circular holes 40 of the lamp body 39. The main bracket 60 is then coupled to the exposed cylindrical columns 26 by means of set screws, as shown in FIG. 5. Subsequently, the additional bracket 70 is mounted to the lamp body 39 at one side of the main bracket 60 by means of set screws. The electric bulb 80 is then mounted to the additional bracket 70 by fitting both ends of the electric bulb 80 in the rings 61 and 71 of the additional bracket 70. The lens 90 is then mounted to the lamp body 39 by forcibly fitting protrusions 91 in the rectangular slots 41 of the lamp body 39.

Figure 6:
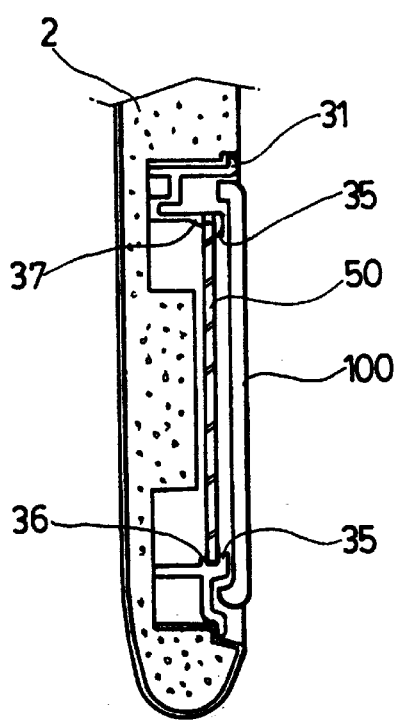
FIG. 6 is a cross-sectional view taken along the line II—II of FIG. 4.
Figure 7:
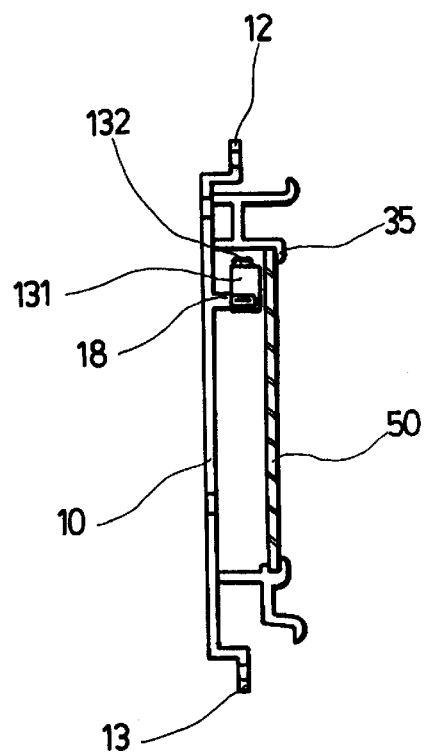
FIG. 7 is a cross-sectional view taken along the line III—III of FIG. 4.

The mirror 50 and cover 100 are coupled to the mirror body 30 prior to the mounting of the mirror body 30 to the sun visor 2 in a state seated in the recess 4. The coupling of the mirror 50 and cover 100 to the mirror body 30 is carried out as follows. First, the mirror 50 is rearwardly inserted into the opening 33 of the mirror body 30 in such a fashion that its upper end is fitted between the upper portion of the inward flange 35 and the support protrusions 37. Thereafter, the mirror 50 is positioned in parallel to the plane of the opening 33, and then downwardly moved in order to cause its lower end to be fitted between the lower portion of the inward flange 35 and the support protrusions 36. Thus, the mirror 50 is stably mounted to the mirror body 30. This can be clearly seen by referring to FIGS. 6, 7, and 8.

Figure 11:
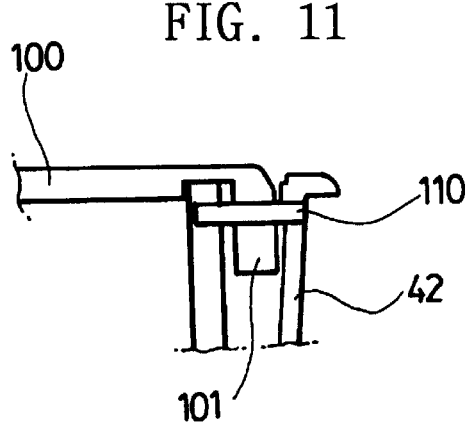
FIG. 11 is a cross-sectional view taken along the line VII—VII of FIG. 4.

The cover 100 is coupled to the mirror body 30 by inserting the hinge portions 101 of the cover 100 into the hinge receiving portions 42 of the mirror body 30 through the opened front portions of the hinge receiving portions 42 in a state, in which the plate springs 120 are fitted in the hinge receiving portions 42, and then laterally inserting the pins 110 through pin holes formed at the hinge receiving portions 42 and hinge portions 101, thereby hingably coupling those hinge receiving portions 42 and hinge portions 101 by the pins 110. This can be clearly seen by referring to FIG. 11.

In this state, the hinge portions 101 of the cover 100 are biased by the plate springs 120 fitted in the hinge receiving portions 42 of the mirror body 30. The mounting of the plate springs 120 in the mirror body 30 is carried out prior to the mounting of the cover 100 to the mirror body 30. Each plate spring 120 is fitted in the associated hinge receiving portion 42 through the opened upper portion of the hinge receiving portion 42 in such a fashion that the protrusion 124 of the lower plate 122 is engaged with the engagement groove 43 formed at the hinge receiving portion 42. In a state in which the hinge portion 101 of the cover 100 is received in the associated hinge receiving portion 42 of the mirror body 30, it is supported by the support piece 123 of the upper plate 121 included in the associated plate spring 120.

Since each hinge portion 101 of the cover 100 has an inverted trapezoidal shape provided with the round and narrow cam surface 102 and inclined surface 103, it is in contact with the support piece 123 of the associated plate spring 120 in a state in which the cover 100 is closed. In this state, the cover 100 is urged by the plate springs 120 to rotate clockwise when viewed in FIG. 12. Accordingly, the closed state of the cover 100 is stable. When the cover 100 is opened, the cam surface 102 thereof moves along the inclined surface 103 of the associated plate spring 120 and then comes into contact with the free end of the support piece 123. That is, the free end of the support piece 123 is seated on the cam surface 102 of the hinge portion 101. In this state, the cover 100 is urged by the plate springs 120 to be prevented from rotating clockwise. Accordingly, the cover 100 is stably maintained in an opened state without being closed.

As mentioned above, each plate spring 120 is fitted in the associated hinge receiving portion 42 in such a fashion that the rear wall of the hinge receiving portion 42 is interposed between the upper and lower plates 121 and 122 of the plate spring 120. The protrusion 124 of the lower plate 122 is also engaged with the engagement groove 43 of the hinge receiving portion 42. Accordingly, the plate springs 120 are maintained in a firmly fitted state in the hinge receiving portions 42, so that they are prevented from being separated from the hinge receiving portions 42. Thus, the plate springs 120 reliably support the cover 100. This can be clearly seen by referring to FIG. 12.

Meanwhile, when the cover 100 is opened, the switch actuating member 104 of the cover 100 rotates, so that it depresses the moving terminal 132 of the switch 130 mounted to the mirror-end base plate 10, thereby causing the electric bulb 80 to be electrically connected to a power supply (not shown). Accordingly, the electric bulb 80 is turned on. Since the electrical connection between the electric bulb 80 and the power supply is achieved by simply connecting both ends of the electric bulb 80 to the power supply, no further description will be made. Since the cover 100 is stably maintained in an opened state, the state of the switch actuating member 104 depressing the moving terminal 132 of the switch 130 is stable. Accordingly, there is no phenomenon in which the lamp turns off unintentionally during its use.

The vanity mirror of the present invention has a construction, in which the lamp body 39 is integral with the mirror body 30, while using no rear cover. The electric bulb 80 is also held in the lamp body 39 by the brackets 60 and 70 having simple constructions. Accordingly, the lamp body 39 has a simple inner construction. By virtue of such a simple inner construction of the lamp, the manufacture and assembly of the vanity mirror can be easily conducted. Also, the vanity mirror can be reduced in thickness and weight.

As apparent from the above description, the present invention provides a vanity mirror of a sun visor for an automotive vehicle which has a simple, light and thin construction using constituting elements simplified in construction and decreased in number while being capable of providing a stable mounting of plate springs adapted to maintain a cover at its opened or closed position, thereby allowing the cover to be stably maintained in its opened state, so that the electric bulb of a lamp adapted to be turned on and off in accordance with the opened and closed positions of the cover is prevented from being unintentionally turned off during its use. Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A vanity mirror of a sun visor for an automotive vehicle comprising:

a mirror body fitted in a recess provided at the sun visor and mounted with a mirror, the mirror body having a pair of recessed spring fitting portions at respective upper corners thereof and an engagement protrusion at one lateral end thereof;

a lamp body integral with the mirror body, the lamp body being mounted with a main lamp holding bracket, an additional lamp holding bracket coupled to the main lamp holding bracket, an electric bulb held by the lamp holding brackets, and a lens while having circular holes;

a cover hingably coupled to the mirror body in such a fashion that it is hinged between an opened position thereof and a closed position thereof, the cover having, at respective upper corners thereof, a pair of hinge portions hingably fitted in the spring fitting portions of the mirror body;

a pair of plate springs respectively fitted in the spring fitting portions of the mirror body and adapted to urge the hinge portions of the cover so that the cover is maintained in an opened or closed state;

a mirror-end base plate mounted in the recess of the sun visor and provided with a groove for receiving the engagement protrusion of the mirror body; and a lamp-end base plate mounted in the recess of the sun visor and provided with cylindrical columns fitted in the circular holes of the lamp body, the cylindrical columns supporting the main lamp holding bracket by set screws threadedly coupled thereto via the main lamp holding bracket;

whereby the mirror body and the lamp body are fitted in the recess of the sun visor in an integral fashion.

2. The vanity mirror according to claim 1, wherein:

each of the plate springs has a U-shaped construction including an upper plate and a lower plate integral with each other, the upper and lower plates being fitted around a portion of an associated one of the spring fitting portions;

each of the spring fitting portions has an engagement groove; and the lower plate in each of the plate springs has a protrusion adapted to be engaged with the engagement groove in an associated one of the spring fitting portions.

3. The vanity mirror according to claim 1, further comprising:

a switch mounted to the mirror-end base plate and adapted to switch on and off the electric bulb, the switch having a moving terminal;

a switch actuating member provided at the cover and adapted to rotate in accordance with a hinging movement of the cover between the opened position and the closed position, thereby selectively depressing the moving terminal;

a cutout provided at the mirror body and adapted to provide a space allowing the rotating movement of the switch actuating member;

whereby the switch actuating member depresses the moving terminal of the switch when the cover is opened, thereby turning on the electric bulb.

\* \* \* \* \*